No. 757,775. PATENTED APR. 19, 1904.
W. RUNDLE.
NUT LOCK.
APPLICATION FILED DEC. 29, 1903.
NO MODEL.

Witnesses
R. Ovendale
L. Barton

Inventor
William Rundle
by Chas. Ovendale
Attorney

THE NORRIS PETERS CO., PHOTO-LITHO., WASHINGTON, D. C.

No. 757,775. Patented April 19, 1904.

UNITED STATES PATENT OFFICE.

WILLIAM RUNDLE, OF JOHANNESBURG, TRANSVAAL.

NUT-LOCK.

SPECIFICATION forming part of Letters Patent No. 757,775, dated April 19, 1904.

Application filed December 29, 1903. Serial No. 187,051. (No model.)

*To all whom it may concern:*

Be it known that I, WILLIAM RUNDLE, a subject of the King of England, residing at Johannesburg, Transvaal, have invented certain new and useful Improvements in Nut-Locks, of which the following is a specification.

This invention relates to a nut-lock or to means for retaining a nut in any desired position on a bolt or the like.

The invention may be applied to any form of nut and bolt or to set-screws or other like contrivances employed for any of the ordinary uses to which such devices are put and in which it may be desirable to securely lock the nut or stud after it has been screwed into position. It may be applied to bolts and nuts, set-screws, and the like made of any suitable metal or to nuts and bolts, screws, or the like made of wood or other suitable material.

The improvements can be applied irrespective of the dimensions of the nut or bolt, set-screw, or the like or of the shape and pitch of the screw-thread. It provides a simple, efficient, and comparatively inexpensive means for the purpose above specified and, further, it is applied in an expeditious manner.

The invention consists, essentially, in forming that part or a portion of that part of the bolt on which the screw-thread is cut with one, two, or more longitudinal grooves, which penetrates or penetrate the bolt for some distance beyond the bottom of the thread, and in arranging in a recess formed in the under side of the nut and round the bolt a wire fixing which embraces or partially embraces the bolt and projects up the longitudinal groove or grooves and is turned over into a recess or groove or recesses or grooves formed in the top of the nut.

As applied to a set-screw or the like, the longitudinal groove or grooves is or are preferably cut the full length of the thread and the wire fixing located in a recess formed round the hole on the under side of the plate or other object into which it is to be screwed and the wire turned out of the groove into a recess or groove formed in the plate or into a boss formed round the hole on the top or outside of the plate.

The invention will now be described by aid of the accompanying sheet of illustrative drawings.

Figure 1:
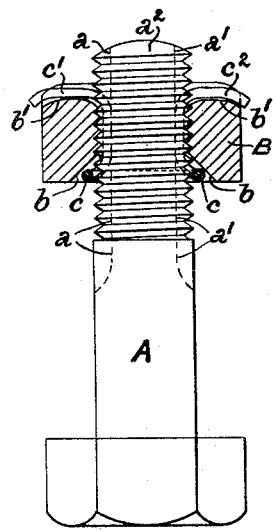
Figure 3:
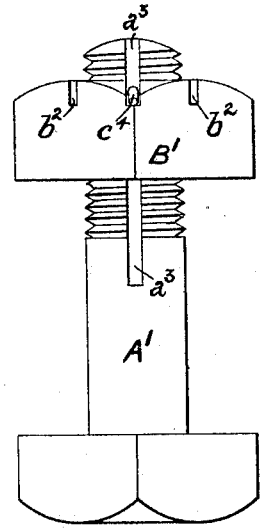
Figure 2:
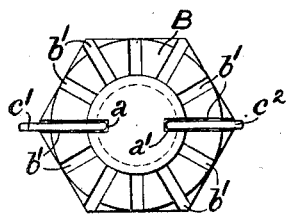
Figure 4:
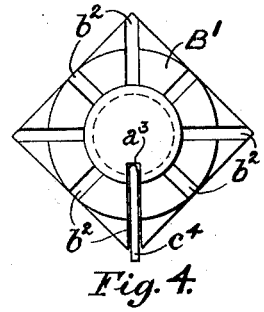
Figure 9:
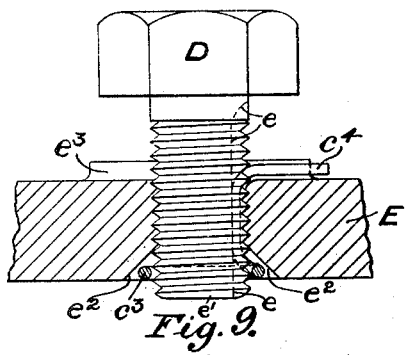
Figure 5:
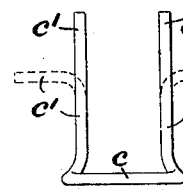
Figure 7:
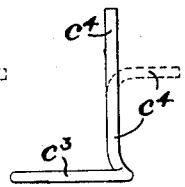
Figure 6:
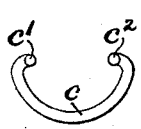
Figure 8:
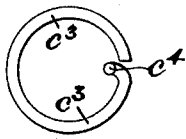
Figure 10:
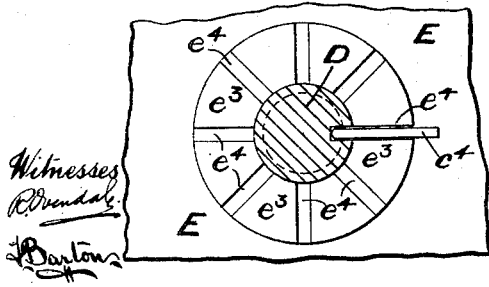

In the drawings, Figure 1 is an elevation of a bolt, showing one form of the invention for fixing the nut in position, the nut being shown in section. Fig. 2 is a plan of Fig. 1. Fig. 3 is an elevation of a nut and bolt, showing a slightly-modified form of the invention. Fig. 4 is a plan of Fig. 3. Fig. 5 shows an elevation of one form of the wire fixing. Fig. 6 is a plan of Fig. 5. Fig. 7 is an elevation of a modified form of the wire fixing. Fig. 8 is a plan of Fig. 7. Fig. 9 is a sectional elevation showing the invention applied to the fixing of a set-screw; and Fig. 10 is a plan of Fig. 9, partly in section.

Figs. 1 and 2 show the invention applied to a common form of bolt A and hexagonal nut B. In these figures the bolt A is shown provided with two diametrically opposite longitudinal grooves $a$ $a'$ cut into the bolt A for the full length of the threaded portion $a^2$. The grooves $a$ $a'$ penetrate the bolt A for some distance beyond the bottom of the screw-thread $a^2$. The grooves $a$ $a'$ are cut sufficiently deep into the core of the screwed portion $a^2$ that the wire fixing lies clear of the bottom of the thread $a^2$ when the wire is placed in the grooves $a$ $a'$, so that it does not impede the screwing of the nut onto the bolt A. In this arrangement the wire fixing is of the form shown in Figs. 5 and 6, and it comprises the semicircular or approximately semicircular part $c$ and the parts $c'$ $c^2$, which are turned up at right angles to the plane of the part $c$. When the fixing is in position, the semicircular part $c$ partially encircles the threaded portion $a^2$ of the bolt and the upturned parts $c'$ $c^2$ fit into the grooves $a$ $a'$ beyond the bottom of the screw-thread. The under side of the nut B is formed with a recess $b$ round the hole in which the part $c$ of the wire fixing is located, so as to allow the nut B to come directly into contact with the plate or other object against which it is to be screwed.

In the top of the nut B is formed a number of preferably radial grooves or recesses $b'$. The nut B is shown in Fig. 2 provided with twelve such radial grooves $b'$; but any other suitable number may be formed therein. After the nut B has been screwed into position the ends of the parts $c'$ $c^2$ of the wire fixing are bent over into the grooves or recesses $b'$ in the top of the nut B. In arranging the parts the bolt A may be first placed in position and the wire fixing then passed over the screwed portion of the bolt until the part $c$ rests against the plate or other object up to which the nut is to be screwed, the parts $c'$ $c^2$ resting in the bottom of the longitudinal grooves $a$ $a'$ in the bolt A. The nut B is then screwed onto the bolt A against the plate or other object, when the part $c$ of the wire fixing takes up a position in the recess $b$ in the under side of the nut. The ends of the parts $c'$ $c^2$ are then bent outward into two opposite grooves $b'$ in the top of the nut, and by that means the nut B is prevented rotating round the bolt A.

In Figs. 3 and 4 the bolt A' is shown fitted with an ordinary square nut B'. In this arrangement the form of wire fixing shown in Figs. 7 and 8 is employed. It comprises a circular part $c^3$, one end, $c^4$, of which is turned up at right angles to the part $c^3$. The bolt A' is provided with one longitudinal groove $a^3$, in which the part $c^4$ of the fixing is located. The part $c^3$ encircles the bolt and is located in a recess formed in the under side of the nut. The nut B' is shown provided with eight of the radial grooves $b^2$, into any one of which the end of the part $c^4$ of the wire fixing may be bent, according to the position of the nut after it has been screwed home. The manner of applying this arrangement is similar to that described with reference to Figs. 1 and 2.

It will be obvious that two or more of the wire fixings of the construction shown may be used instead of one, as shown and described, the recess in the under side of the nut being made sufficiently deep to receive the base portions of the two or more fixings.

In Figs. 9 and 10, in which the invention is shown as applied to the fixing of a set-screw in a plate, D represents the set-screw, screwed into the plate E. The set-screw is formed with a longitudinal groove $e$. The length of the threaded portion $e'$ and the wire fixing, which is of the construction shown in Figs. 7 and 8, has its base portion $c^3$, which encircles the threaded part of the set-screw, located in a recess $e^2$, formed round the hole in the plate E, into which the set-screw is screwed. The top of the plate E is shown formed with a boss $e^3$, in which are formed eight radial grooves $e^4$, into any one of which the part $c^4$ of the fixing may be bent to secure the set-screw D in position. This construction may be readily adapted to suit particular requirements or circumstances.

What I claim as my invention, and desire to protect by Letters Patent, is—

1. A nut-lock or means for retaining a nut in position on a bolt or the like, comprising a bolt formed with a plurality of grooves longitudinally of and in the threaded portion, a nut provided with a recess in the under side, a wire fixing arranged in said recess which encircles or partially encircles the threaded portion of the bolt and projects up the longitudinal grooves and has its outer ends turned over into grooves formed in the top of the nut, substantially as described.

2. In a nut-lock or means for retaining a nut in position on a bolt or the like, in combination, the bolt A formed with the longitudinal grooves $a$ $a'$ in the threaded portion, the nut B formed with the recess $b$ on the under side and with a plurality of grooves $b'$ in the top thereof, the wire fixing comprising the base part $c$ arranged in the recess $b$ of the nut B, and the parts $c'$ $c^2$ fitting into the grooves $a$ $a'$ in the bolt A with their outer ends turned into the grooves $b'$ in the top of the nut to secure the nut in position on the bolt, substantially as described.

3. In a means for locking a set-screw or the like, in combination, the set-screw D formed with the longitudinal groove $e$ in the threaded portion thereof, the plate or other object E into which the set-screw D is screwed, the recess $e^2$ in the bottom of the plate E, the wire fixing comprising the part $c^3$ arranged in the recess $e^2$ and encircling or partially encircling the thread of the set-screw, and the part $c^4$ fitting into the groove $e$ in the set-screw, and having its outer end turned into engagement with one or other of the grooves $e^4$ in the top of the plate or other object E, substantially as described.

In witness whereof I have hereunto set my hand in the presence of two subscribing witnesses.

WILLIAM RUNDLE.

Witnesses:
   CHAS. OVENDALE,
   R. OVENDALE.